United States Patent [19]

Park

[11] Patent Number: 4,833,927
[45] Date of Patent: May 30, 1989

[54] CABLE TENSIOMETER

[75] Inventor: Brian V. Park, Portland, Conn.

[73] Assignee: Teleco Oilfield Services Inc., Meriden, Conn.

[21] Appl. No.: 510,332

[22] Filed: Jul. 1, 1983

[51] Int. Cl.⁴ .............................................. G01L 5/04
[52] U.S. Cl. ................................................ 73/862.45
[58] Field of Search ............ 73/862.45, 862.47, 862.48

[56] References Cited

U.S. PATENT DOCUMENTS

| | | | |
|---|---|---|---|
| 2,118,727 | 5/1938 | Hanes | 73/862.47 |
| 2,266,361 | 12/1941 | Edwards | 73/862.47 |
| 3,310,981 | 3/1967 | Nixon et al. | 73/862.45 |
| 3,570,307 | 3/1971 | Cohen et al. | 73/862.47 |
| 3,572,110 | 3/1971 | James et al. | 73/862.48 |
| 4,120,197 | 10/1978 | Johansson | 73/862.48 |
| 4,163,126 | 7/1979 | Van Mastrigt | 73/862.47 X |
| 4,433,586 | 2/1984 | Ohrnell et al. | 73/862.48 |

FOREIGN PATENT DOCUMENTS

| | | | |
|---|---|---|---|
| 2610267 | 9/1976 | Fed. Rep. of Germany | ... 73/862.47 |
| 2063494 | 6/1981 | United Kingdom | ............ 73/862.48 |

Primary Examiner—Richard L. Chiesa
Attorney, Agent, or Firm—Fishman, Dionne & Cantor

[57] ABSTRACT

A cable tensiometer (referred to herein as a weight beam) is presented for measuring line tension in a wire rope. The cable tensiometer is characterized by a beam section, a load cell mounted on the beam section and configured so as to measure variable forces in tension, rather than in compression, and clamping of the cable at a single central point at the load cell, with all other cable contacts being free floating.

16 Claims, 2 Drawing Sheets

CABLE TENSIOMETER

BACKGROUND OF THE INVENTION

This invention relates to the field of measurement of load or weight on a cable. More particularly, this invention relates to a cable tensiometer, referred to herein as a weight beam, for measuring line tension in a cable, particularly a wire rope, to determine the weight or load being carried by the cable.

There are many applications and situations in which it is both desirable and important to accurately measure the load being carried by a cable, such as a wire rope. One field in which this information is very important is the oil well drilling field; and while this invention is by no means limited to use in that field, it will be discussed in relation to that environment for purposes of illustration and explanation.

In the oil well drilling field, it is important to know and monitor the total hook load acting on the draw works of the drilling rig to know the weight on the drill bit. In the prior art, this data is typically obtained by the use of devices which measure the tension in the cable by means of a mechanism at the dead line anchor. Cable tension has also been measured by a hydraulic load cell, in which the load cell is loaded in compression. However, the devices of the prior art have a number of drawbacks, in that they are relatively complicated, or are subject to error, or do not have dependable repeatability, or may require special tooling. One feature of the prior art hydraulic load cell devices which contributes to their deficiencies is that they measure a compression load on the sensing element to determine the tension in the cable; and this introduces potential inaccuracies and errors in these prior art systems.

SUMMARY OF THE INVENTION

The above discussed deficiencies and shortcomings of the prior art are overcome or significantly reduced by the weight beam device of the present invention. In accordance with the present invention, the hook load being supported by a cable is measured and determined by a weight beam which is attached to the cable and contains a load cell which is under tension at all times during operation of the weight beam.

The weight beam of the present invention has a steel beam section of rectangular cross section. A load cell is centrally mounted to the beam and is positioned between a pair of end rollers which are to be in rolling contact with the cable. A cable clamp grasps the cable and is connected directly to the load cell. The load cell is connected to the beam section by an adjustable screw mechanism which is operated to impose a tension on the cable, and thus load the load cell in tension when the device is mounted on a cable to perform its function.

Various features and advantages of the present invention will be apparent to and understood by those skilled in the art from the following detailed description and drawings.

BRIEF DESCRIPTION OF THE DRAWINGS

Referring now to the drawings, wherein like elements are numbered alike in the several FIGURES.

DESCRIPTION OF THE PREFERRED EMBODIMENT

Figure 1:
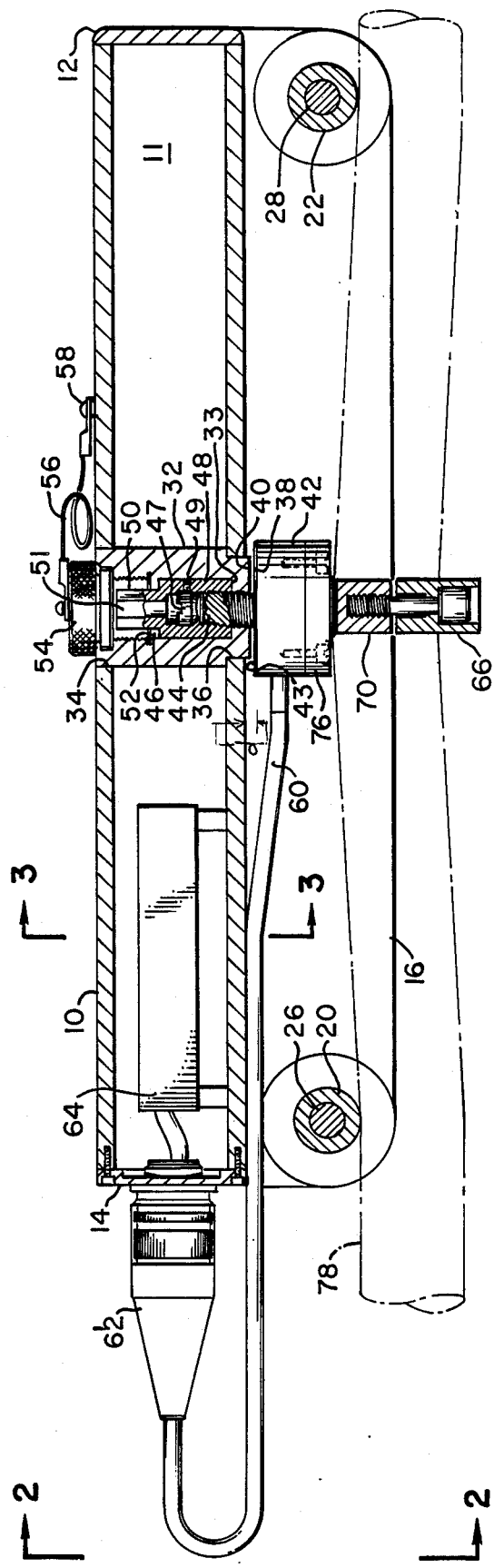
FIG. 1 is a side sectional view of the load cell of the present invention.
Figure 4:
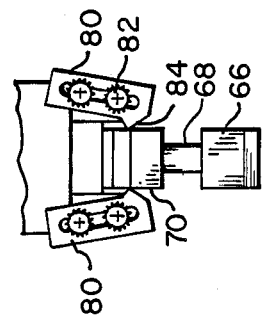
FIG. 4 shows a detail of the clamping mechanism.
Figure 3:
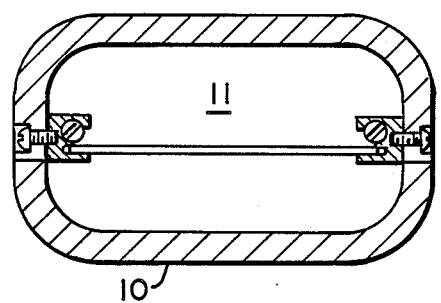
FIG. 3 is a sectional view along line 3—3 of FIG. 1.
Figure 2:
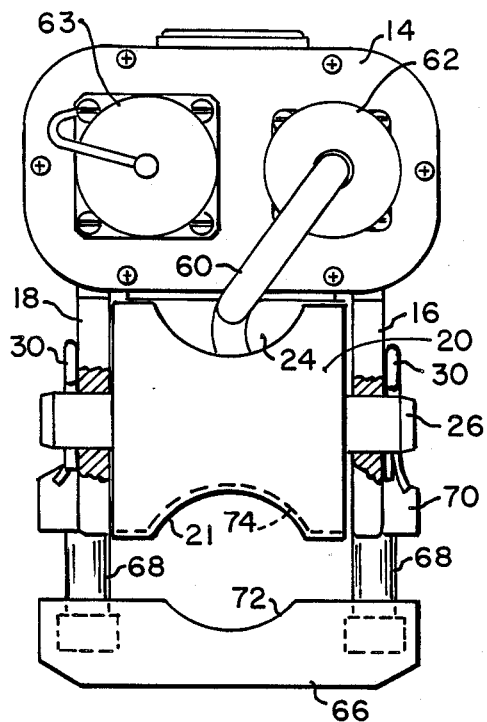
FIG. 2 is a top end view from the left end of FIG. 1.

Referring jointly to FIGS. 1, 2 and 3, the weight beam of the present invention has a main body section 10 of generally rectangular cross section. Body or beam 10 is about 20 inches long, and it is preferably of stainless steel. It may be formed from two similarly shaped segments welded together to form a rigid beam. The center of beam 10 is hollow (as best seen in FIG. 3) to define an interior space 11, and the right and left ends are closed by end caps 12 and 14, respectively, with end cap 12 being permanently welded in place and end cap 14 being removably attached by thread fasteners as shown in FIG. 1. A pair of spaced parallel flanges 16 and 18 project from one side of beam 10. Flanges 16 and 18 act both as stiffeners for beam 10 and as supports for a pair of end load rollers 20 and 22 which are positioned at opposite ends of the channel 24 defined between the flanges 16 and 18. Rollers 20 and 22 are rotatably mounted to the flanges 16 and 18 on axles 26 and 28 which are journaled in appropriately shaped openings in the flanges and retained in place by cotter pins 30. Since cable of different diameters may be used, the recess 21 of the rollers is sized to receive the largest cable which may be used. Alternatively, rollers of different diameters may be used depending on the diameter of the cable involved in the system. The rollers are removable and interchangeable by pulling a pin 30 and removing the axle.

A cross block 32 is positioned at the center (both transverse and longitudinal) of beam 10. Cross block 32 is of cylindrical cross section, and it is welded in position in appropriately shaped openings 34 and 36 in the rear and front faces of body 10. The front face opening 36 is smaller than the rear face opening 34, and cross block 32 has a reduced diameter portion 38 which projects a slight distance beyond the front face of body 10 to serve as a welding lip.

A load cell 42 (which may be a standard BLH load cell, part No. V2M1-5000, available from Baldwin Lima Hamilton of Waltham, Mass.) is connected to the cross block 32 adjacent to front face 40 of the cross block by means of an integral screw 44 which projects from the rear of the load cell into a central cavity 46 in cross block 32. Screw 44 threadably engages a bolt 48 in central chamber 46 which, in turn, terminates in a socket head 50 which will mate with an appropriate wrench. A positioning nut 47 is also threadably engaged in the interior of bolt 48 and is locked into a desired set position by a set screw 49. The position of positioning nut 47 may be adjusted by loosening set screw 49 and insertion of a screw driver or other tool through a central passage 51 in socket 50 into a cross notch in nut 47. A snap in washer or retainer 52 retains bolt 48 in chamber 46. Chamber 46 is closed by an end cap 54 which is threaded into the rear surface of body 10, cap 54 being connected to body 10 by a flexible cable 56 and pin 58 to prevent it from being lost or misplaced.

A most important feature and requirement of the present invention is that the positioning nut 47 engages the end of screw 44 to limit the travel of the load cell and insure that load cell 42 is spaced a predetermined distance "d" above the front face of beam 10. As a result, the rear face 43 of load cell 42 does not ever bear against the beam, per se or the front face of cross block 32. Rather, the rear face of load cell 42 is spaced from and free floating relative to body 10. The load on load cell 42 is transmitted through screw 44 to nut 48 and to cross block 32 and to the beam 10 via contact between the nut end surface and shoulder 33 on the cross block. Load cell 42 has an electrical bridge network for load measurement; and this electrical bridge network is connected by conductor 60 through a connector 62 to an electronics package 64 housed within interior space 11 of the weight beam.

The structure of the weight beam is completed by a clamp mechanism which is adapted to clamp to a cable. The clamp mechanism includes a first clamp segment of jaw 66 which is adjustably connected by adjusting bolts 68 to a second similarly shaped jaw segment 70. Jaw segments 66 and 70 have correspondingly shaped recesses 72 and 74 to receive and clamp onto a cable. Jaw segment 70 has a circular base segment 76 to which that jaw segment is connected by four screw fasteners 78 to the load cell.

A pair of side load guides 80 are connected by adjustable fasteners 82 to the exterior surface of each of the flanges 16 and 18 at the location of the clamp mechanism. These guide elements have pressure or contact points 84 which bear against clamp segment 70 on opposite sides thereof to prevent any deflection of the clamp due to side loads.

To position and operate the weight beam mechanism describes above, nut 48 is turned in the loosening direction to move load cell 42 away from front face 40 of cross block 32. This frees up the device for mounting of the clamp onto a cable. Clamp bolts 68 are then removed to permit separation of clamp jaw 66 from clamp jaw 74. The weight beam is then placed on the cable (indicated at 78 in FIG. 1) so that the cable is in contact with the rollers 20 and 22. Jaw segment 66 is then placed over the cable and bolts 68 are reconnected to jaw segment 70 so that the cable is locked in the jaw recesses 72 and 74. At this point, the cable is sitting in the rollers 20 and 22 (which will function as load or reaction elements); and the cable is gripped tightly by the clamp; but there is no load on the load cell 42. Next, socket head 50 is engaged by an appropriate wrench and the socket is turned in the appropriate direction to tighten bolt 48. That is, the bolt 48 is turned in the direction to draw in screw 44 to the limit permitted by the position of positioning nut 47. This operation deflects the cable a predetermined amount "x" toward the weight beam. That is, between the points of contact with rollers 20 and 22, the cable is deflected inwardly toward the weight beam by a predetermined amount. This predetermined amount will, of course, be a function of the relative sizing of the various components in the mechanism. However, the theory and functioning of the invention require that the cable be deflected by this predetermined amount; and in a predetermined configuration the deflection is 0.30 inches. This deflection of the cable places load cell 42 under a tension load, and reaction forces are transmitted to the weight beam through the rollers 20 and 22 which bear against the cable.

Figure 5:
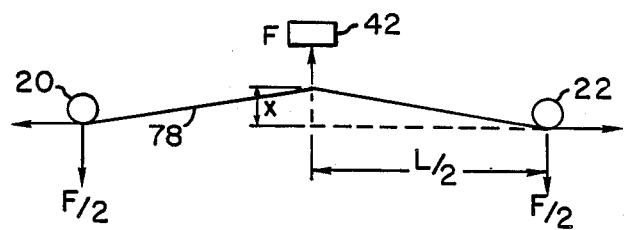
FIG. 5 is a schematic load diagram for the weight beam of the present invention.

Assuming, of course, that the cable has a hook load or is otherwise loaded, the tension load on the load cell is a measure of a component of the cable tension and is directly proportional to the cable tension, and hence to the load on the cable. This relationship is best explained and illustrated with reference to FIG. 5. In the original set up, cable 78 is deflected by a precise distance "x". This distance "x" is consistent from installation to installation, and it is determined by the distance from the inner surface of shoulder 33 to the surface of positioning nut 47 engaged by the end of screw 44. The load cell force F can then be expressed by the relationship $$F = \frac{2Tx}{L/2} \text{ or } F = \frac{4Tx}{L}$$

where T is the tension in the cable, x is the distance identified above, and L is the distance between the centers of the reaction wheels 20 and 22.

The load cell is electrically powered and generates and delivers an output signal in the millivolt range which is then delivered to electronic package 64 where it may be converted into a frequency or other signal for display or other use. Package 64 is connected by another connector 63 to a display unit. Of course, as the load on the cable, and hence cable tension, varies, the output of the load cell will vary and the load cell will vary and this change in output will be transmitted the electronics package to reflect the change in load on the cable.

The weight beam of the present invention has a number of significant advantageous features. The fact that the load cell measures force and variations in force in tension greatly enhances the accuracy of this device relative to prior art devices which operate in compression. The cable is clamped at only a single central point at the load cell, with all other cable contact being free floating. The unit allows for and compensates for differential expansion of the cable due to temperature and other causes of cable stretch (such as tension or aging) by the use of the reaction rollers which accommodate any such differential movement without distorting the relationship between the load cell and the cable. The unit is extremely simple to assemble, mount on the cable and dismount from the cable. Also, the unit can be used with a variety of cables sizes; and to that end, the unit would be made and supplied with rollers and clamps sized for the largest cable for which the unit is to be used. Alternatively, rollers and clamps of different sizes may be used.

It is also to be noted that load cell 42 is recessed between and protected by the flanges 16 and 18 so that it is not expected to physical misuse or damage in handling the unit. Another feature and advantage of the present invention is that it can be installed on a cable while the cable is under tension and without interfering with the drilling process.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A weight beam for measuring load on a cable, the weight beam including:
   a beam body;
   load cell means mounted on said beam body, said load cell means being spaced a predetermined distance from said beam body;
   clamp means connected to said load cell means and adapted to grip a cable whose tension is to be measured; and adjusting means connected to said load cell to deflect the cable and put said load cell under a tension load, said clamp means and said adjusting means being structurally distinct.

2. The weight beam of claim 1 wherein:
said beam body is generally rectangular in cross section.

3. The weight beam of claim 1, including:
housing means for said adjusting means, said housing means including a bearing surface to receive the load from said load cell means.

4. The weight beam of claim 3 wherein:
said beam body is rectangular in cross section and defines a generally hollow interior space;
said housing means is located in said interior space; and
said adjusting means includes a screw means extending from said load cell means into said housing and nut means in said housing threadably engaging said screw means.

5. The weight beam of claim 4, including:
socket means on said nut means for adjustment of said nut relative to said screw.

6. The weight beam of claim 4, including:
adjustable stop means in said housing to limit the movement of said screw means relative to said nut means.

7. The weight beam of claim 6 wherein:
said beam body includes opposed spaced apart first and second surfaces; and wherein
said housing means extends through said second surface of said beam body spaced from said first surface, the interior of said housing means being accessible through said second surface for adjustment of said nut means or said stop means.

8. The weight beam of claim 1, including:
a pair of reaction means spaced apart on said beam body with said load cell being positioned between said pair of reaction means.

9. The weight beam of claim 8 wherein:
said beam body is generally rectangular in cross section.

10. The weight beam of claim 8 wherein:
each of said reaction means is roller means adapted to bear against the cable whose tension is to be measured.

11. The weight beam of claim 10, including:
first and second flange elements on one side of said beam body, said roller means being rotatably mounted in said flange elements.

12. The weight beam of claim 8, including:
housing means for said adjusting means, said housing means including a bearing surface to receive the load from said load cell means.

13. The weight beam of claim 12 wherein:
said beam body is rectangular in cross section and defines a generally hollow interior space;
said housing means is located in said interior space; and
said adjusting means includes a screw means extending from said load cell means into said housing and nut means in said housing threadably engaging said screw means.

14. The weight beam of claim 13, including:
socket means on said nut means for adjustment of said nut relative to said screw.

15. The weight beam of claim 13, including:
adjustable stop means in said housing to limit the movement of said screw means relative to said nut means.

16. The weight beam of claim 15 wherein:
said beam body includes opposed spaced apart first and second surfaces; and wherein
said housing means extends through said second surface of said beam body spaced from said first surface, the interior of said housing means being accessible through said second surface for adjustment of said nut means or said stop means.

* * * * *